United States Patent Office 2,748,049
Patented May 29, 1956

2,748,049
PROCESS OF ADHERING TEXTILE FIBERS TO RUBBERS AND PRODUCT THEREOF

Edward F. Kalafus, Akron, Ohio, assignor to The General Tire and Rubber Company, Akron, Ohio, a corporation of Ohio No Drawing. Application February 9, 1953, Serial No. 335,997

8 Claims. (Cl. 154—139)

This invention relates to adhesives and particularly to latex adhesives for bonding fibers or cords of cotton, rayon, nylon and the like to natural and synthetic rubbers.

In the manufacture of many fabric-reinforced, molded rubber articles, especially automobile tires, it is desirable to obtain strong adherence between the fabric and the rubber, and also high resistance to deterioration of the bond with flexing of the structure. In the case of pneumatic tires, the flex-life of the carcass is probably the most critical factor affecting the life of tires in service. Long flex-life is dependent not only upon the inherent flexibility of the carcass structure and the strength of the bond between the tire fabric and the adjacent rubber, but also upon fatigue resistance under repeated flexing over long periods of time.

Many adhesives known to produce very strong bonds between rubber and fabric are entirely unsuitable for many rubber fabric structures because the bonds deteriorate or the fabric ruptures when the structures are subjected to repeated flexing. Thus flex-life cannot be foretold from measurements of bond strengths alone.

When cotton fabrics are employed in the production of fabric reinforced rubber articles, it is possible to calender the rubber into the fabric in such manner as to work the rubber between the fibers of the individual cords or threads, thus obtaining a mechanical interlocking of the two materials, and this practice has been followed for many years. However, the mechanical bond obtainable in this manner with cotton fibers is not entirely satisfactory, and the calendering process is substantially inoperative when applied to most continuous synthetic fibers, such as rayon and nylon, which are formed into cords by a twisting process that leaves the cords practically devoid of interstices into which the rubber can be forced by the calendering rolls.

This problem of obtaining satisfactory adhesion between rubber and cords of synthetic fibers was the principal obstacle that delayed the use of such fibers in fabrics for pneumatic tire carcasses. The problem was finally solved to a degree, in the case of rayon, by the use of mixtures of natural latex and resorcinol or casein. The casein-latex adhesive was comparatively flexible but the strength and character of the adhesive bond obtained left much to be desired. The resorcinol-formaldehyde latex mixture was developed and widely used in the tire industry, particularly with rayon fabrics. While fair adhesion was obtainable with this adhesive, it formed a relatively hard and stiff film on the fabric that seriously impaired its flexibility and flex-life and the adhesion between synthetic rubber and fabrics was nowhere nearly as good as desired.

In accordance with the subject invention, I have discovered an adhesive dip that strongly adheres to the fabric and rubber and which at the same time is relatively flexible.

It is accordingly one object of the present invention to provide an inexpensive, relatively flexible fiber-to-rubber adhesive.

It is another object of this invention to provide a fiber-to-rubber adhesive in which a firm bond between the fiber or fabric and rubber is achieved. Other objects and advantages of the subject invention will become apparent from the following description thereof.

In accordance with this invention, I have discovered an adhesive dip comprising an aqueous dispersion of (a) 70 to 95 parts dry solids weight of a copolymer of from 65 to 90 parts of a conjugated diolefinic compound of less than seven aliphatic carbon atoms and from 10 to 35 parts of an unsaturated aldehyde of the general formula

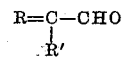

where R is a bivalent aliphatic hydrocarbon radical of less than four carbon atoms (preferably methylene) and R' is a member of a group consisting of hydrogen, methyl and ethyl and (b) 5 to 30 parts by dry solids weight of a condensation product selected from the group consisting of phenol-formaldehyde, urea-formaldehyde, casein-formaldehyde, and melamine-formaldehyde. This dip forms an inexpensive, flexible, and firm bond between fiber or fabric and rubber.

The conjugated diolefinic compound includes substituted and unsubstituted diolefines of less than seven aliphatic carbon atoms such as butadiene, dimethyl butadiene, chloroprene, isoprene, and cyanoprene.

Suitable alpha beta unsaturated aldehydes include acrolein, methacrolein, alpha ethyl acrolein, alpha methyl beta ethyl acrolein, crotonaldehyde, and the like. These aldehydes are included within the general formula

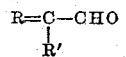

in which R is a bivalent hydrocarbon of less than four carbon atoms and R' is a member of the group consisting of hydrogen methyl and ethyl. Methacrolein is the preferable aldehyde because it is commercially available and readily forms copolymers with the diolefine.

The condensation product is preferably primarily a resorcinol-formaldehyde condensation product although any of the group consisting of other phenol-formaldehyde, urea-formaldehyde, casein-formaldehyde, and melamine-formaldehyde may also be used. The condensation product is thus the product of a condensation reaction between an aldehyde reactive compound (phenols, urea, casein, and melamine) and an aldehyde, preferably formaldehyde. Resorcinol resoles and resorcinol-phenol resoles, whether formed in situ within the acrolein or substituted acrolein-diolefinic compound latex or formed separately in aqueous solution, are considerably superior to other condensation products in the adhesive mixture.

In accordance with this invention, the copolymer of the conjugated diolefinic compound and unsaturated aldehyde is prepared in a conventional emulsion polymerization recipe and reacted to almost 100 per cent conversion. The diolefine should constitute from 60 to 90 parts and preferably around 75 parts by weight of the copolymer and the unsaturated aldehyde from 10 to 35 parts by weight and preferably around 25 parts of the copolymer.

The resorcinol or other corresponding aldehyde reactive component of the condensation product may be dissolved in water to which around 37 per cent formaldehyde has been added together with a strong base such as sodium hydroxide. The strong base should generally constitute around 7.5 per cent or less of the resorcinol or other component. The aqueous solution of the resole or condensation product or resin is mixed with the diolefine-aldehyde latex. The resole or other mentioned condensation product or materials that form said condensation product should constitute from 5 to 40 parts and preferably around 10 to 25 parts by solids of the latex mixture. The condensation product forming the resole or resole type resin forming materials should preferably be partially reacted or reacted so as to be only partially soluble in water. Sufficient water is then preferably added to give around 20 per cent by weight overall solids in the final dip.

I have found it is preferable to first prepare the copolymer of the diolefine and unsaturated aldehyde and then add the partially condensed condensation product. However, the ingredients, for example, the resorcinol or phenol may be added to the latex in uncondensed form and the entire condensation may there take place in situ. The latex tends to keep longer and be more stable if it is kept alkaline.

In accordance with this invention, the cord or fabric to be treated is dipped for one to two or three minutes in this latex dip and dried at from 75 to 140° C. for one to five up to twenty minutes and thereafter calendered into the rubber and cured therewith. Preferable drying temperature is around 100° C. and preferable drying time is around five minutes.

The following example illustrates this invention.

EXAMPLE 1

A series of butadiene-methacrolein latices were made up using 180 parts of water, 75 parts of butadiene, 25 parts of methacrolein, 5 parts of soap, 2 parts of potassium persulfate, (a free radical producing catalyst) and .4 part of mixed tertiary mercaptans having an average of 16 carbon atoms as modifier. The reaction was carried out to substantially complete conversion. The resultant latex was mixed with a resole formed in situ by adding to the latex the amount of resorcinol and formaldehyde shown in table 1. The adhesion of the dip to both rayon and nylon was tested and the results shown in table 1 were obtained.

Table 1

| Dip No. | Parts by wt. Polymer | Parts by wt. Resorcinol | Parts by wt. CH₂O | Parts by wt. NaOH | Percent NaOH Based on Resorcinol | Mole Ratio to Methacrolein | | Adhesion | |
|---|---|---|---|---|---|---|---|---|---|
| | | | | | | Resorcinol | CH₂O | Rayon, lbs. | Nylon, lbs. |
| 1 | 100 | 39.3 | 10.7 | 1.18 | 2.5 | 1 | 1 | 20.3 | 12.1 |
| 2 | 100 | 39.3 | 10.7 | 2.36 | 5 | 1 | 1 | 16.7 | 13.4 |
| 3 | 100 | 39.3 | 10.7 | 3.4 | 7.5 | 1 | 1 | 22.6 | 17.0 |
| 4 | 100 | 39.3 | 10.7 | 3.93 | 10.0 | 1 | 1 | 18.1 | 14.3 |
| 5 | 100 | 19.64 | 5.36 | 0.49 | 2.5 | 0.5 | 0.5 | 20.7 | 18.5 |
| 6 | 100 | 19.64 | 5.36 | 0.98 | 5 | 0.5 | 0.5 | 21.1 | 15.7 |
| 7 | 100 | 19.64 | 5.36 | 1.47 | 7.5 | 0.5 | 0.5 | 21.7 | 18.9 |
| 8 | 100 | 19.64 | 5.36 | 1.96 | 10 | 0.5 | 0.5 | 17.5 | 14.9 |
| 9 | 100 | 9.72 | 2.68 | 0.24 | 2.5 | 0.25 | 0.25 | 15.6 | 22.8 |
| 10 | 100 | 9.72 | 2.68 | 0.48 | 5.0 | 0.25 | 0.25 | 16.5 | 19.7 |
| 11 | 100 | 9.72 | 2.68 | 0.72 | 7.5 | 0.25 | 0.25 | 18.6 | 23.4 |
| 12 | 100 | 9.72 | 2.68 | 0.97 | 10.0 | 0.25 | 0.25 | 15.2 | 18.8 |

The adhesion tests by which the scope and utility of the invention have been determined, as described above, were all performed in the same manner. Each adhesive dipped cord that was tested was anchored at each end between pairs of rectangular pieces of uncured, highly-carbon-black-loaded rubber compound. The rectangular pieces of rubber were all of a uniform size, measuring 0.375x1.000x0.1100 inches. Each was backed on one side with cotton duck that was cemented thereto. Each end of the cord was placed between the rubber faces of two such rectangles and the rectangles were cured while held together in a steam-heated hydraulic press at about 300° F.

A Model x-3 Scott tester having specially designed, slotted jaws was used for gripping the pairs of rectangles at opposite ends of the cord without squeezing the cord. A fixed jaw speed of two inches per minute was employed, and the force in pounds required to pull the cord free from the enclosing rectangles at either end was taken as the measure of the strength of the adhesive bond obtained. Between the time when the cords were dipped and dried and the time when they were tested, they were stored in closed glass containers to avoid the effects of non-uniform exposure.

Since the flex-life as well as the bond strength is important, the flex-life of fibers dipped in a dip of the subject invention was tested. This was done by using dip #2 of Example 1 in the construction of several passenger car pneumatic tires. These tires were built in the customary manner. Similar tires employing a conventional butadiene-vinyl pyridine copolymer compounded with resorcinol and formaldehyde as the dip were also secured. Both kinds of tires were driven loaded and underinflated until they failed from flexing fatigue. The tires using the adhesive dip of the subject invention ran from 10 to 30 per cent longer than those using the conventional vinyl pyridine type dip.

In the above example, the amount of methacrolein may be varied and the methacrolein in the copolymer may be substituted in whole or in part by acrolein and other butadiene copolymerizable aldehyde as above pointed out to obtain some benefits of the emulsion although methacrolein is the preferred comonomer. A styrene may be substituted for part of the butadiene as above set forth. Part of all of the butadiene may be substituted by other diolefinic compounds of less than 7 aliphatic carbon atoms without much change in adhesive properties.

In place of part or all the resorcinol-formaldehyde resole in the above example, I may use one or more of the other above noted aldehyde condensation products such as the condensation products of phenol and aldehyde, urea-aldehyde, melamine-aldehyde. When the novolac type of phenol-aldehyde condensation products are used, care should be used to insure stabilization of acid residue before introduction into a non-acid stable latex as is obvious to those skilled in the art. I can also add with good results up to 10 to 15 parts of styrene or any styrene that is copolymerizable with butadiene to the monomer mixture from which the copolymer is formed.

The aldehyde groups in the copolymer which result from the acrolein or methacrolein and the like are reactive to resorcinol and other aldehyde-reactive compounds used in preparing the condensation product in that some benefits are obtained without addition of formaldehyde or free aldehyde to the latex along with the resorcinol. Much better results are obtained, however, with the addition of a free aldehyde, particularly formaldehyde. The combination of free and polymer combined aldehyde provides superior adhesion. When the latex must be stored for extensive periods, there is a tendency to gel unless the ratio of resorcinol to total aldehyde is controlled. Higher ratios of resorcinol or other phenol or urea to aldehyde tend to gel faster.

A mole ratio of 1:1 or less for the aldehyde reactive compound forming the condensation product, such as resorcinol, to the free aldehyde, such as formaldeyhde, is preferable in order to insure satisfactory storage. The adhesion and gel time tend to decrease as the amount of resorcinol to free aldehyde is increased. However, a phenol (including resorcinol) to free aldehyde ratio up to 2.5 or 3.0 may be used to gain part of the advantages if it is used soon after condensation. As the mole ratio of resorcinol to aldehyde is decreased to less than .25 the adhesion generally decreases in value although such latex mixes may be very stable.

The present invention is useful in bonding natural and synthetic rubbers including hydrocarbon—comprising synthetic rubbers and sulfur—vulcanizable rubbers to fabrics. Examples of the rubbers so adhered are polymers of a conjugated diolefinic compound of less than 8 carbon atoms including butadiene 1,3, isoprene dimethyl butadiene, cyanoprene, and chloroprene and copolymers of one or more of these with a mono-olefinic compound copolymerizable therewith including styrene, nuclearly chlorinated styrenes, 3,4, dichloralphamethylstyrene, olefinic ketones including methylvinyl ketone, methylisopropenyl ketone, acrylonitrile, acrylic and methacrylic esters and the like.

In the formation of composite articles of the rubber and fabric, the vulcanizable rubber compound is cured in contact with the textile fabric which was first wetted with the subject adhesive dip and thereafter dried. Heat and pressure is used in forming and vulcanizing the articles as is customary in the art. The invention is especially applicable in producing tires, conveyor belts, and other rubber and fabric articles.

It is understood that in accordance with the provisions of the patent statutes, variations and modifications of the invention herein described may be made without departing from the spirit of the invention.

Having thus described my invention what I claim is:

1. A composite article of rubber and fabric comprising textile fibers having over surface portions thereof a mixture of (a) an unmasticated copolymer of 70 to 95 parts by weight of a conjugated diolefinic compound of less than 7 aliphatic carbon atoms with 10 to 35 parts by weight of an aldehyde of the general formula

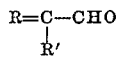

where R is a bivalent aliphatic hydrocarbon radical of less than 4 carbon atoms and R' is methyl and (b) a resinous condensation product of a phenol and an aldehyde, and an in situ vulcanized rubber compound contacting the coated surfaces of said fibers.

2. The process of adhering textile fibers to sulfur vulcanizable rubbers comprising the steps of immersing said fibers in an aqueous dispersion of (a) 70 to 95 parts by dry solids weight of a copolymer of from 65 to 90 parts by weight of a conjugated diolefinic compound of less than 7 aliphatic carbon atoms and from 10 to 35 parts by weight of an unsaturated aldehyde of the general formula

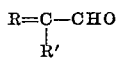

where R is a bivalent saturated aliphatic hydrocarbon radical of less than 4 carbon atoms and R' is a member of the group consisting of hydrogen and methyl and (b) 5 to 40 parts by dry solids weight of a condensataion product of an aldehyde reactive compound capable of combining with an aldehyde to form a resole type resin, and an aldehyde, said condensation product being reacted so as to be only partially soluble in water, drying said treated, immersed fibers at 75 to 140° C. for 1 to 20 minutes, adhering the treated fibers to uncured, sulfur-vulcanizable rubber, and curing said rubber in contact with said treated fibers.

3. The process of adhering textile fibers to sulfur vulcanizable rubbers comprising the steps of immersing said fibers in an aqueous dispersion of (a) 70 to 95 parts by dry solids weight of a copolymer of from 65 to 90 parts by weight of a conjugated diolefinic compound of less than 7 aliphatic carbon atoms and from 10 to 35 parts by weight of an unsaturated aldehyde of the general formula:

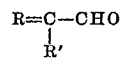

where R is a bivalent, saturated, aliphatic hydrocarbon radical of less than 4 carbon atoms and R' is a member of the group consisting of hydrogen and methyl and (b) 5 to 40 parts by dry solids weight of a partially water soluble resorcinol-formaldehyde condensation product, drying said treated, immersed fibers at 75 to 140° C. for 1 to 20 minutes, adhering the treated fibers to uncured, sulfur-vulcanizable rubber, and curing said rubber in contact with said treated fibers.

4. A composite article of rubber and fabric comprising textile fibers having over surface portions thereof a mixture of (a) an unmasticated copolymer of 70 to 95 parts by weight of a conjugated diolefinic compound of less than 7 aliphatic carbon atoms with 10 to 35 parts by weight of an aldehyde of the general formula

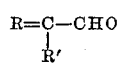

where R is a bivalent aliphatic hydrocarbon radical of less than 4 carbon atoms and R' is a member of the group consisting of hydrogen and methyl and (b) a resinous condensation product of a phenol and an aldehyde, said textile fibers contacting in situ a vulcanized rubber compound.

5. A composite article of rubber and fabric comprising textile fibers having over surface portions thereof a mixture of (a) an unmasticated copolymer of 70 to 95 parts by weight of a conjugated diolefinic compound of less than 7 aliphatic carbon atoms with 10 to 35 parts by weight of an aldehyde of the general formula

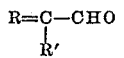

where R is a bivalent aliphatic hydrocarbon radical of less than 4 carbon atoms and R' is a member of the group consisting of hydrogen and methyl and (b) a resinous condensation product of an aldehyde reactive compound capable of combining with an aldehyde to form a resole-type resin and an aldehyde.

6. A composite article of rubber and fabric comprising textile fibers having over surface portions thereof a mixture of (a) a copolymer of 65 to 90 parts by weight of butadiene and 10 to 35 parts of methacrolein and (b) 5 to 40 parts of a resorcinol-formaldehyde condensation product, said textile fibers contacting in situ a vulcanized rubber compound.

7. The process of adhering textile fibers to sulfur vulcanizable rubbers comprising the steps of immersing said fibers in an aqueous dispersion of (a) 70 to 95 parts by dry solids weight of a copolymer of 65 to 90 parts of butadiene and 10 to 35 parts of methacrolein and (b) 5 to 40 parts by dry solids weight of a resinous condensation product of an aldehyde reactive compound capable of combining with an aldehyde to form a resole-type resin and an aldehyde, drying said treated immersed fibers at 75 to 140° C. for 1 to 20 minutes, adhering the treated fibers to uncured, sulfur-vulcanizable rubber, and curing said rubber in contact with said treated fibers.

8. The process of adhering textile fibers to sulfur vulcanizable rubbers comprising the steps of immersing said fibers in an aqueous dispersion of (a) 70 to 95 parts by dry solids weight of a copolymer of 65 to 90 parts of butadiene and 10 to 35 parts of methacrolein and (b) 5 to 40 parts by dry solids weight of a partially water soluble resorcinol-formaldehyde condensation product, drying said treated immersed fibers at 75 to 140° C. for 1 to 20 minutes, adhering the treated fibers to uncured, sulfur-vulcanizable rubber, and curing said rubber in contact with said treated fibers.

References Cited in the file of this patent

UNITED STATES PATENTS

| | | |
|---|---|---|
| 2,499,724 | Compton | Mar. 7, 1950 |
| 2,561,215 | Mighton | July 17, 1951 |
| 2,569,932 | Izard | Oct. 2, 1951 |
| 2,615,826 | Mallory et al. | Oct. 28, 1952 |